(12) United States Patent
Orlov et al.

(10) Patent No.: US 8,256,010 B2
(45) Date of Patent: Aug. 28, 2012

(54) PROVIDING ACCESS TO A DATA ITEM USING ACCESS GRAPHS

(75) Inventors: Alexey V. Orlov, Aachen (DE); Dmitry V. Starostin, Aachen (DE)

(73) Assignee: Microsoft Corporation, Redmond, WA (US)

(*) Notice: Subject to any disclaimer, the term of this patent is extended or adjusted under 35 U.S.C. 154(b) by 723 days.

(21) Appl. No.: 12/416,164

(22) Filed: Apr. 1, 2009

(65) Prior Publication Data
US 2010/0257204 A1 Oct. 7, 2010

(51) Int. Cl.
*G06F 21/00* (2006.01)
(52) U.S. Cl. .............. 726/27; 707/783; 707/E17.044; 713/193; 715/741; 715/742; 715/743; 726/3; 726/21; 380/278
(58) Field of Classification Search .............. 707/783; 715/741–743
See application file for complete search history.

(56) References Cited

U.S. PATENT DOCUMENTS

| | | | | |
|---|---|---|---|---|
| 6,802,013 | B1* | 10/2004 | Follendore, III | 726/19 |
| 2002/0010861 | A1 | 1/2002 | Matsuyama et al. | |
| 2002/0124082 | A1* | 9/2002 | San Andres et al. | 709/225 |
| 2004/0174999 | A1 | 9/2004 | Iwamura et al. | |
| 2005/0018853 | A1 | 1/2005 | Lain et al. | |
| 2005/0027797 | A1* | 2/2005 | San Andres et al. | 709/203 |
| 2005/0097061 | A1* | 5/2005 | Shapiro et al. | 705/67 |
| 2006/0010483 | A1* | 1/2006 | Buehler et al. | 726/1 |
| 2006/0015514 | A1 | 1/2006 | Suga | |
| 2006/0165040 | A1 | 7/2006 | Rathod et al. | |
| 2006/0242072 | A1* | 10/2006 | Peled et al. | 705/51 |
| 2007/0044159 | A1* | 2/2007 | Ishiguro | 726/27 |
| 2007/0136607 | A1 | 6/2007 | Launchbury et al. | |
| 2008/0263370 | A1* | 10/2008 | Hammoutene et al. | 713/193 |
| 2009/0080658 | A1* | 3/2009 | Waters et al. | 380/277 |

FOREIGN PATENT DOCUMENTS
WO 2008065347 A2 6/2008

OTHER PUBLICATIONS

Atallah, et al., "Dynamic and Efficient Key Management for Access Hierarchies", Nov. 7-11, 2005, Proceedings of the 12th ACM Conference on Computer and Communiation Security, pp. 190-202.*
International Search Report for PCT Application No. PCT/US2010/029712, Mailed on Oct. 29, 2010, 8 pages.
Zych, et al., "Key Management Method for Cryptographically Enforced Access Control," retrieved at <<https://www.cosic.esat.kuleuven.be/wissec2006/papers/5.pdf>>, Proceedings of the 5th International Workshop on Security in Information Systems, 2007, 16 pages.

(Continued)

*Primary Examiner* — David Garcia Cervetti
*Assistant Examiner* — Dorianne Alvarado David

(57) ABSTRACT

An approach is described for controlling access to a data item using one or more access graphs. The approach entails distributing a compact package of access-related information to a recipient that pertains to the access graphs. The recipient can use the access-related information to access the data item through the access graphs in an off-line mode of operation. In one implementation, the access-related information includes markers associated with edges between nodes in the access graphs. One type of marker can link the data item to two or more nodes of the access graphs. This type of marker can be used to implement a logical AND operation among two or more policy factors.

20 Claims, 12 Drawing Sheets

OTHER PUBLICATIONS

Bouwman, et al., "Rights Management for Role-Based Access Control," 5th IEEE Consumer Communications and Networking Conference, retrieved at <<http://ieeexplore.ieee.org/ielx5/4446297/4446298/04446544.pdf? arnumber=4446544>>, Jan. 10-12, 2008, pp. 1085-1090.

"Tricryption Desktop," product description, retrieved at <<http://www.eruces.com/index.php/products-overview/tricryptionkeydesktop>>, retrieved on Feb. 13, 2009, 3 pages.

"Technical Overview of Windows Rights Management Services for Windows Server 2003," Microsoft Windows Server 2003 White Paper, retrieved at <<http://download.microsoft.com/download/8/d/9/8d9dbf4a-3b0d-4ea1-905b-92c57086910b/RMSTechOverview.doc>>, 2005, pp. 1-29.

"Adobe® LiveCycle® ES for Life Sciences," product description page, Adobe Systems Incorporated, San Jose, CA, retrieved at <<http://www.adobe.com/lifesciences/solutions/livecycle/>>, retrieved on Feb. 12, 2009, 2 pages.

"Adobe LiveCycle Policy Server 7.2," Datasheet, Adobe Systems Incorporated, San Jose, CA, retrieved at <<http://store.wip3.adobe.com/products/server/policy/datasheet_ps.html>>, retrieved on Feb. 12, 2009, 5 pages.

Atallah, et al., "Dynamic and Efficient Key Management for Access Hierarchies," Proceedings of the 12th ACM Conference on Computer and Communications Security, retrieved at <<http://www.cse.nd.edu/~mblanton/papers/ccs05.pdf>>, 2005, 12 pages.

Mont, et al., "A Flexible Role-based Secure Messaging Service: Exploiting IBE Technology in a Health Care Trial," Proceedings of the 14th International Workshop on Database and Expert Systems Applications, retrieved at <<http://ieeexplore.ieee.org/ielx5/8719/27592/01232060.pdf?temp=x>>, Sep. 2003, 6 pages.

Mont, et al., "Towards Accountable Management of Identity and Privacy: Sticky Policies and Enforceable Tracing Services," HP Laboratories, Bristol, HPL-2003-49, retrieved at <<http://www.hpl.hp.com/techreports/2003/HPL-2003-49.pdf>>, Mar. 19, 2003, 17 pages.

"Advanced eGovernment Information Service Bus," home page, retrieved at <<http://www.egov.bus.org/web/guest/home>>, retrieved on Feb. 12, 2009, 1 page.

Erickson, John. S., review of "Digital Rights Management: Business and Technology" by William Rosenblatt, et al., D-Lib Magazine, retrieved at <<http://www.dlib.org/dlib/february02/02bookreview.html>>, vol. 8, No. 2, Feb. 2002, 2 pages.

Shamir, Adi, "identity-Based Cryptosystems and Signature Schemes," Proceedings of CRYPTO 84 on Advances in Cryptology, retrieved at <<http://dsns.csie.nctu.edu.tw/research/crypto/HTML/PDF/C84/47.PDF>>, 1985, pp. 47-53.

Boneh, et al., "Identity-Based Encryption from Weil Pairing," SIAM Journal on Computing, vol. 32, No. 3., retrieved at <<http://crypto.stanford.edu/~dabo/papers/ibe.pdf>>, 2003, 31 pages.

"Adobe® LiveCycle® ES: Engaging Beyond the Enterprise to Improve Customer Satisfaction and Service Delivery,"Adobe Systems Incorporated, San Jose, CA, retrieved at <<http://www.adobe.com/products/livecycle/pdfs/lcesbus_wp_es82.pdf>>, 2008, 11 pages.

Driver, Erica "Mitigate Content-Related Risks With Enterprise Rights Management," abstract only, Forrester Research, Sep. 9, 2005, retrieved at <<http://www.forrester.com/Research/Document/Excerpt/0,7211,37694,00.html>>, retrieved on Mar. 31, 2009, 2 pages.

"Adobe® LiveCycle™Policy Server," Datasheet, Adobe Systems Incorporated, San Jose, CA, 2006, 2 pages.

Bertino, et al., "Secure and Selective Dissemination of XML Documents," ACM Transactions on Information and System Security, vol. 5, No. 3, Aug. 2002, pp. 290-331.

Rosenblatt, Bill, "Enterprise Digital Rights Management: Technology Comparison: Authentica Active Rights Management and Microsoft Windows Rights Management Services," Giantsteps Media Technology Strategies, 2005, 24 pages.

"EMC Documentum Information Rights Management Services," Data Sheet, EMC Corporation, Hopkinton, MA, 2006, 4 pages.

Chappell, David, "Introducing Windows CardSpace," Chappell & Associates, Apr. 2006, retrieved from <<http://msdn.microsoft.com/en-us/library/aa480189.aspx>>, 13 pages.

"Information Rights Management—Managing information everywhere it is stored and used," Oracle White Paper, Oracle Corporation, Redwood Shores, CA, Apr. 2007, 20 pages.

Bertino, et al., "A system for securing push-based distribution of XML documents," abstract only, Int. J. Inf. Secur. No. 6, 1 page.

Web Services Security: SOAP Message Security 1.0 (WS-Security 2004), OASIS Standard 200401, Mar. 2004, retrieved at <<http://docs.oasis-open.org/wss/2004/01/oasis-200401-wss-soap-message-security-1.0.pdf>>, 56 pages.

* cited by examiner

PROVIDING ACCESS TO A DATA ITEM USING ACCESS GRAPHS

BACKGROUND

A system may provide an access control model to manage access rights associated with data items (such as documents, etc.) that it distributes to recipients. The model helps reduce the risk that unauthorized entities may gain access to the data items.

An on-line type of access control model uses centralized policy infrastructure to control the dissemination of data items. For example, in this approach, a recipient may request a license from the centralized policy infrastructure to gain access to a data item. The centralized policy infrastructure can consult policy information to determine whether the recipient is entitled to receive the data item. If so entitled, the centralized policy infrastructure may provide a use license to the recipient. The use license enables the recipient to access the data item, typically for a limited amount of time. However, this type of model does not readily accommodate a scenario in which the user wishes to access data items in an off-line manner. In an off-line setting, the recipient may not have access to the centralized policy infrastructure.

Other access control models address the above-noted issues by distributing cryptographic keys to recipients. For example, one type of model provides an access graph that includes a collection of nodes. The nodes define respective access classes. The model assigns keys to the respective nodes in the access graph. The model can grant a recipient access to a particular access class by giving that recipient a key that is associated with a corresponding node in the access graph. This model may therefore enable a user to access data items in an off-line mode of operation (e.g., by distributing appropriate keys to the user in advance). However, among other possible shortcomings, this model may have limitations in its ability to efficiently and flexibly express different types of policy considerations that will govern access to data items.

SUMMARY

An approach is described that allows a recipient to access a data item in off-line fashion using a node structure provided by one or more access graphs. The approach accomplishes this function by linking the data item to the node structure, e.g., thereby treating the data item as a node of the node structure. The approach then distributes a compact package of access-related information to the recipient. The access-related information allows the recipient to access the data item through connections defined by the node structure.

For example, the approach may entail distributing graph information to a recipient. The graph information may include: node structure information which describes at least part of a node structure provided by one or more access graphs; label information which provides labels associated with a set of nodes in the node structure; marker information which provides markers associated with a set of edges between nodes in the node structure; and key information which provides a set of cryptographic keys that entitle the recipient to access at least part of the node structure. The approach also entails providing a data item to the recipient, together with linking information. The data item is protected using a content key. The linking information associates the data item with the node structure. The recipient can use the graph information and linking information to access the content key, e.g., by finding a path through the node structure which "leads to" the data item. The recipient can use the content key to decrypt the data item using the content key.

According to another illustrative aspect, the linking information includes a marker which relates the data item to one or more nodes in the node structure. For example, the linking information can include a marker that uses a logical AND operation to relate the data item to two nodes, node 1 and node 2. For example, the marker can be expressed as: $Y_{12,d}=K_d$ XOR $H((K_1 \text{ XOR } K_2), L_d)$. Here, $Y_{12,d}$ represents the marker, $K_d$ is a key associated with the data item, $K_1$ represents a key associated with node 1 that links to the data item, $K_2$ represents a key associated with node 2 that links to the data item, and $L_d$ is a label associated with the data item.

Among other potential characteristics, the approach may allow recipients to access data items in an off-line manner, e.g., without being connected to centralized policy infrastructure. The approach may also accommodate the distribution of access rights using an economical package of access-related information. The approach also provides an efficient and flexible mechanism for expressing any type of policy consideration, including complex policy considerations that involve the logical combination of two or more policy factors.

The above approach can be manifested in various types of systems, components, methods, computer readable media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 also shows a manner in which a data item can be related to the node structure using linking information.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for accessing data items using one or more access graphs. This disclosure is organized as follows. Section A describes an illustrative system for providing off-line access to data items. Section B describes illustrative methods which explain the operation of the system of Section A. Section C describes illustrative processing functionality that can be used to implement any aspect of the features described in Sections A and B.

Figure 15:
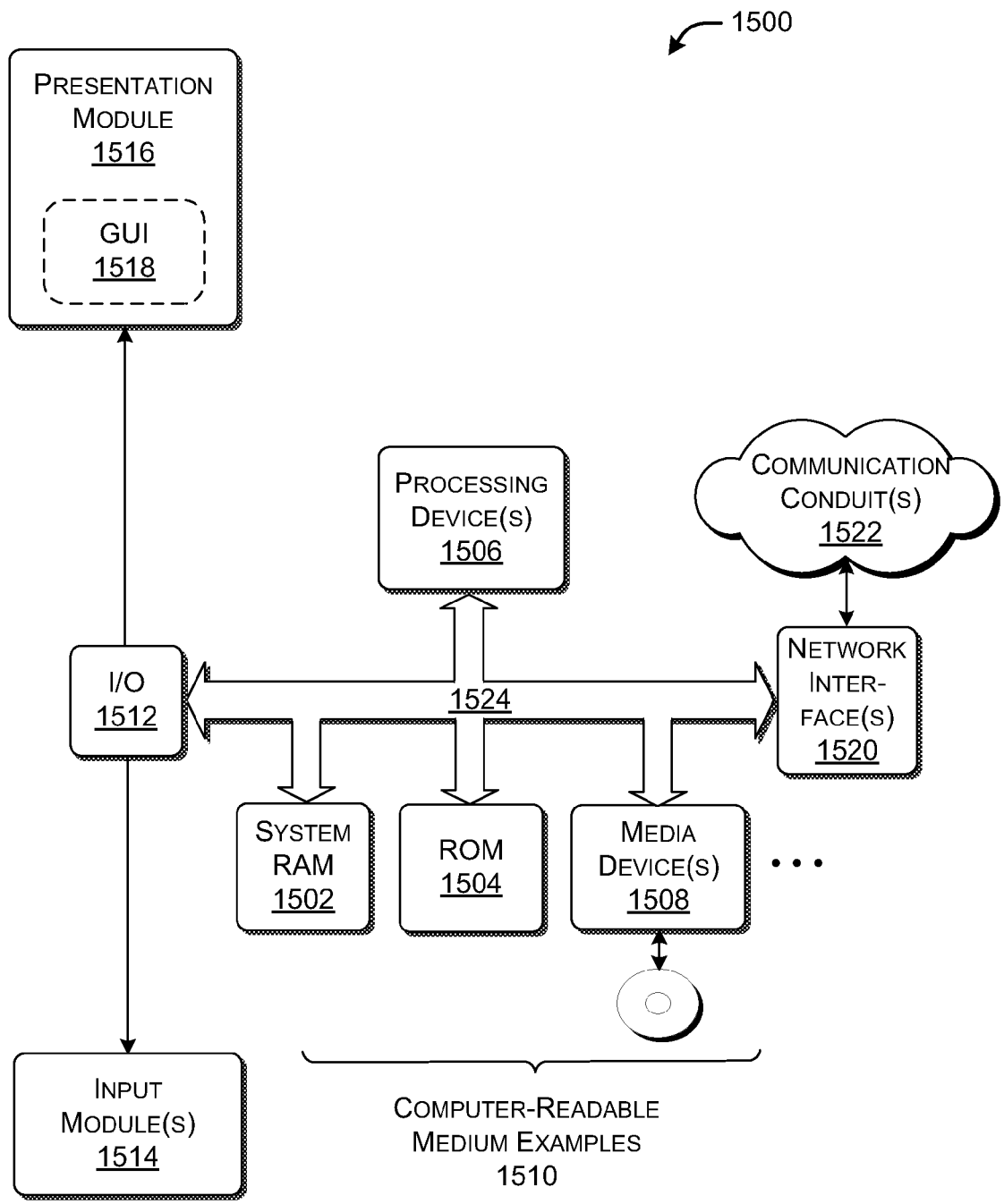
FIG. 15 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 15, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., and/or any combination thereof.

A. Illustrative Systems

A.1. System Overview

Figure 1:
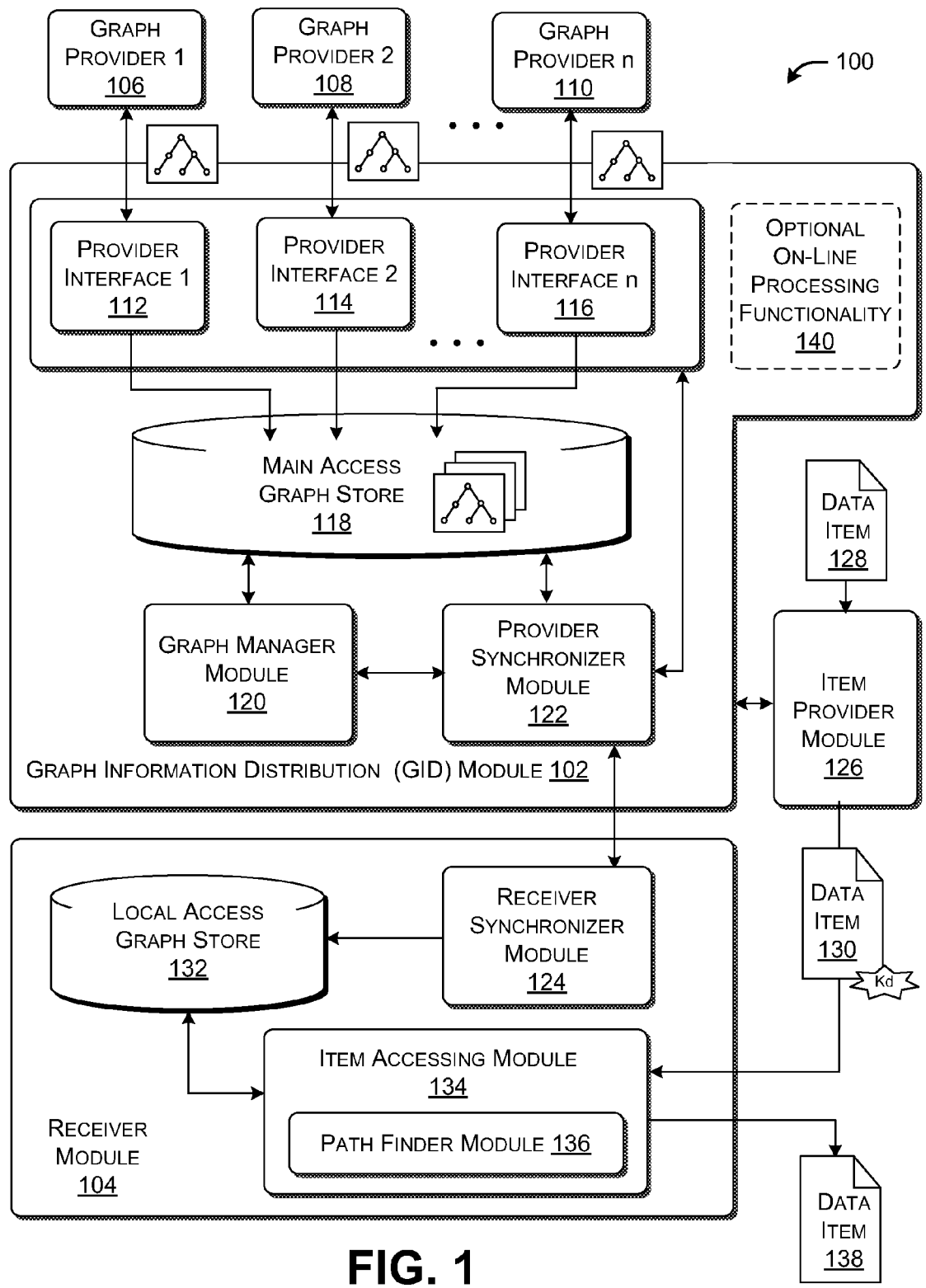
FIG. 1 shows an illustrative electronic system for allowing recipients to access data items in an off-line manner.

FIG. 1 shows an illustrative electronic system 100 ("system" for brevity) for controlling access rights to data items. The term "data item" is to be construed broadly. A data item refers to any unit of information that any entity wishes to protect for any reason. A data item may pertain to a document item, image item, video item, audio item, code file item, markup language item, and so on, or any combination thereof. Further, the data item may pertain to a part of a more encompassing item, such as a page within a document, an object or subroutine within a code file, and so on.

The system 100 protects the data items by controlling the conditions under which entities may access the data items. The following disclosure refers to entities who may receive the data items as "recipients." In some cases, the recipients may refer to users or groups of users who receive and consume the data items for various purposes. Alternatively, or in addition, the recipients may refer to computing functionality which receives the data items. No limitation is placed on what may constitute a recipient as used herein.

FIG. 1 identifies two principal components of the system 100: a graph information distribution (GID) module 102 and a receiver module 104. The GID module 102 operates by sending a concise package of access-related information to the receiver module 104. The receiver module 104 uses the access-related information to access a data item. The receiver module 104 may represent one of a plurality of receiver modules (not shown). Each receiver module may be associated with a recipient of any type which seeks to access the data item for any purpose. For example, the receiver module 104 may represent a computing device that is operated by a human recipient.

Figure 2:
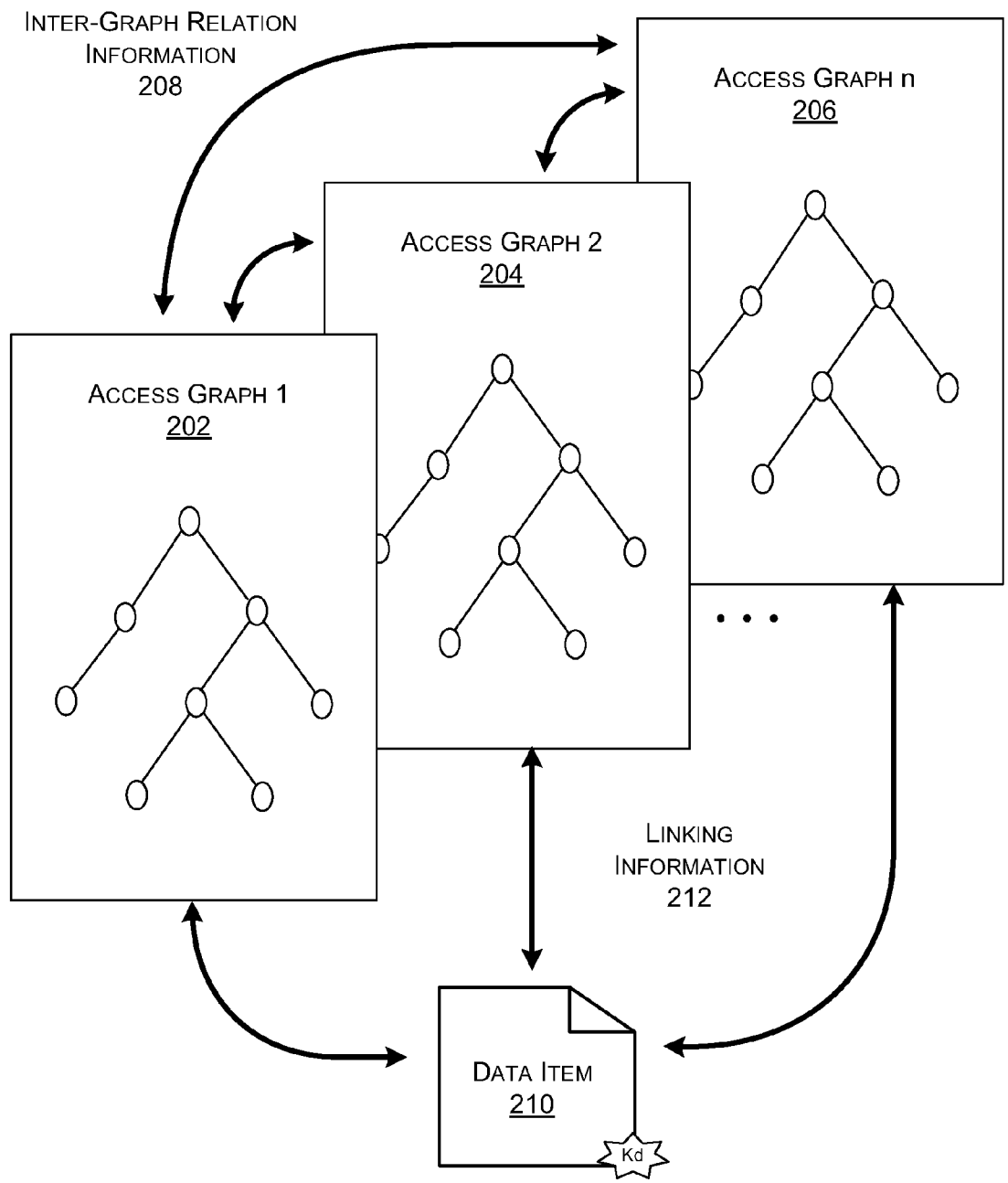
FIG. 2 shows illustrative node structure associated with one or more access graphs.

FIG. 2 is a vehicle for explaining what may constitute access-related information. To facilitate understanding, this figure will be discussed before advancing further in the explanation of FIG. 1.

FIG. 2 depicts a collection of access graphs (202, 204, . . . 206). Each access graph provides information with respect to a particular theme or dimension. For example, one access graph may provide information regarding reporting responsibilities within an organization. This access graph is referred to as a reporting-related access graph. Another access graph may describe units within an organization. This access graph is referred to as a unit-related access graph. Another access graph may describe roles within an organization, and so on. This access graph is referred to as a role-related access graph. No limitation is placed on what may constitute an access graph. In one particular and non-limiting case, the nodes in an access graph may define respective access classes.

An item access policy can be formulated that is a combination of information expressed by the access graphs (202, 204, . . . 206). For instance, a policy may specify that a data item is accessible to recipients who have a particular role r within a particular unit u of an organization, wherein the role information is identified with respect to a role-related access graph and the unit information is identified with respect to a unit-related access graph.

The information within an access graph may be represented as a collection of nodes. For example, a reporting-related access graph may include nodes corresponding to members within an organization. Further, the access graph may include links (or edges) which connect the nodes together. For example, in a reporting-related access graph, a node associated with a manager may include links that connect to nodes associated with the manager's employees. Such an access graph may constitute a directed graph insofar as the links that connect the nodes have directionality. For example, the node associated with the manager includes links which "point to" the nodes associated with the manager's employees. In this example, such an access graph may take the form of a hierarchy of nodes that include a parent-child relationship. But other access graphs may adopt other ways of organizing nodes.

FIG. 2 also illustrates inter-graph relation information 208 which expresses relations among nodes in different hierarchies. For example, the inter-graph relation information 208 may include a link which connects a manager node in a reporting-related access graph to a particular unit node within a unit-related access graph. Collectively, the access graphs (202, 204, ... 206) and inter-graph relation information 208 define a node structure. The term node structure information refers to information that describes the nodes within the node structure and the interconnection of those nodes.

Figure 3:
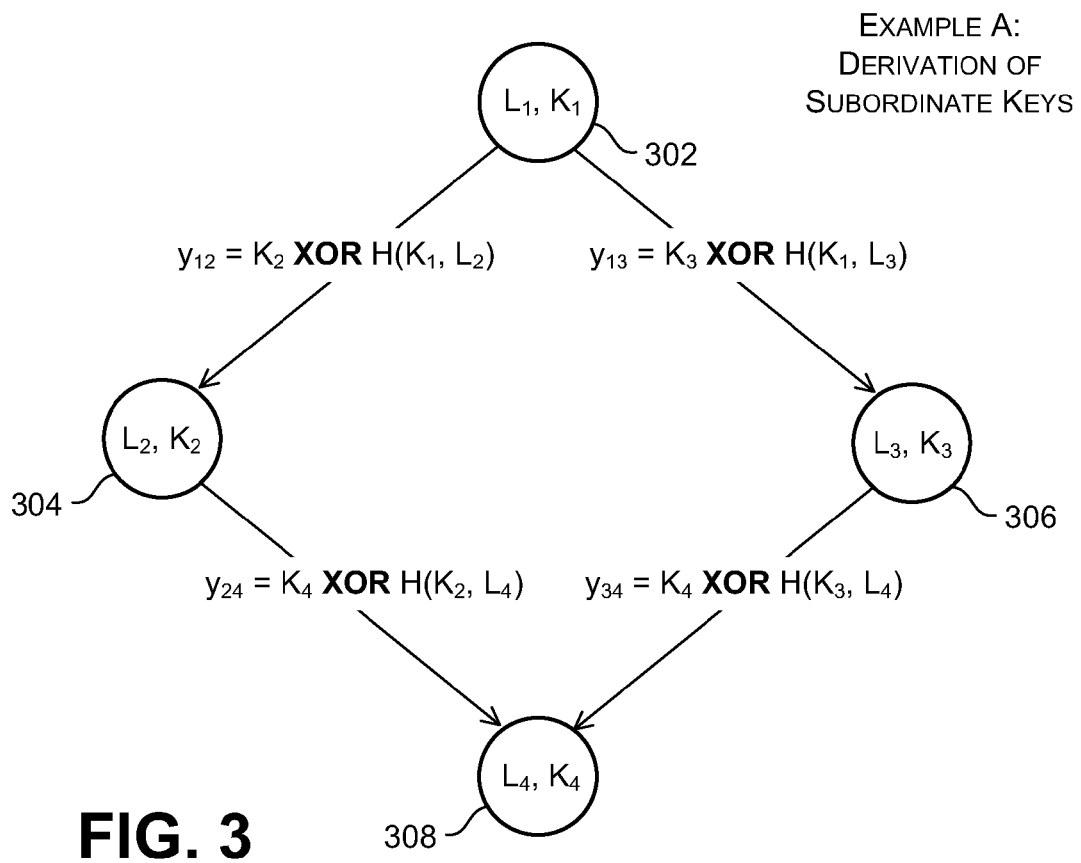
FIG. 3 is an example which demonstrates how key information associated with a node in the node structure can be used to derive key information associated with subordinate (descendent) nodes.

As will be described in greater detail with reference to subsequent figures, each node in the node structure may include a cryptographic key (K) and a label (L) associated therewith. The key (K) describes non-public information that can be generated by any type of cryptographic algorithm. The key can be used by a recipient to gain access to a node that is associated with the key. The label (L) describes public information which represents the node. Further, each link that connects any two nodes i and j includes a public marker associated therewith. FIG. 3, to be described below in turn, provides additional information regarding an illustrative relation between the keys, labels, and markers in an illustrative node structure.

Key information collectively refers to the keys used within the node structure. Label information refers to the labels used within the node structure. Marker information refers to the markers used within the node structure. The general term "graph information" encompasses information regarding various features of the node structure, such as the node structure information, the key information, the label information, and the marker information.

FIG. 2 also shows that a data item 210 can be related to the node structure using one or more links. More specifically, the data item 210 can be treated as a node, like any other node within the node structure. As such, the data item 210 may include a private key and public label associated therewith. More specifically, the key associated with the data item 210 constitutes a content key ($K_d$) that can be used by the receiver module 104 to decrypt the data item. Further, the link (or links) that connect the data item 210 to the rest of the node structure may include one or more markers associated therewith. Linking information 212 corresponds to the above-described information which specifies how the data item 210 is connected to the node structure.

Access-related information refers to both the graph information (including node structure information, key information, label information, and marker information) together with the linking information 212. In a manner which will be described in further detail below, the system 100 passes a concise package of access-related information to the receiver module 104. The receiver module 104 uses the access-related information to access a data item that it is entitled to receive.

The receiver module 104 performs this task by using the provided access-related information to uncover additional key information from the graph, effectively following a path through the node structure which ultimately leads to the content key associated with the sought-after data item. The access-related information that is forwarded to the receiver module 104 is considered concise because it provides sufficient information that allows the receiver module 104 to trace the path to the data item 210, but need not encompass the full wealth of access-related information associated with the node structure as a whole.

With the above introductory discussion regarding the use of access graphs, explanation now returns to FIG. 1. Starting with the GID module 102, this module includes (or can be conceptualized to include) a number of components that perform individual functions. One or more graph providers (106, 108, ... 110) provide access graph information that is used to make up the node structure (of FIG. 2). For example, one graph provider may correspond to a human resource entity which provides information regarding members within an organization. This graph provider can therefore serve as a source which provides information for a reporting-related access graph. No limitation is placed herein on the types of graph providers that can interact with the GID module 102. One or more graph providers can represent independent entities with respect to the GID module 102. Alternatively, or in addition, one or more graph providers can be administered by the same entity associated with the GID module 102.

One or more provider interfaces (112, 114, ... 116) interact with respective graph providers (106, 108, ... 110). The provider interfaces (112, 114, ... 116), for instance, receive access graph information from the respective graph providers (106, 108, ... 110). The provider interfaces (112, 114, ... 116) can use any type of approach to receive the access graph information, such as a push technique in which the graph providers (106, 108, ... 110) independently send the access graph information to the provider interfaces (112, 114, ... 116), a pull technique in which the provider interfaces (112, 114, ... 116) request the access graph information from the graph providers (106, 108, ... 110), and so on. In performing this interaction, the provider interfaces (112, 114, ... 116) can accommodate different protocols used by the graph providers (106, 108, ... 110).

The provider interfaces (112, 114, ... 116) can format the access graph information into respective access graphs having a uniform format. The provider interfaces (112, 114, ... 116) can then store the access graphs in a main access graph store 118. Collectively, the access graphs can form a node structure, as discussed with respect to FIG. 2. The node structure can also be supplemented to include inter-graph relation information 208 which links nodes among different access graphs. Further, the node structure can preserve information which indicates the origins of different parts of the node structure. For example, the node structure can maintain information which indicates that the nodes in a reporting-related access graph originate from a human resource entity.

A graph manager module 120 performs various functions relating to the node structure provided in the main access graph store 118. For example, the graph manager module 120 can add key information, label information, and marker information to the node structure. As explained with reference to FIG. 2, the key information and the label information correspond to private keys and public labels that are associated with individual nodes in the node structure. The marker information corresponds to public markers which are associated with the edges between nodes within the node structure. Later figures will explain how the key information, label information, and marker information can be related together. The graph manager module 120 may re-calculate the key information, label information, and marker information upon each update to the node structure, e.g., as new information is received from the graph providers (106, 108, . . . 110).

The graph manager module 120 can also play a role in selecting a concise package of graph information to be sent to the receiver module 104. Functionally, the graph manager module 120 performs this task by selecting a set of graph information that is just sufficient to enable the receiver module 104 to access appropriate data items. Thus, knowledge of the data items to be accessed is one factor that controls what graph information is appropriate to send to the receiver module 104. In general, the graph manager module 120 may not need to send an entire set of graph information associated with the node structure as a whole. As such, the graph manager module 120 may attempt to avoid sending an over-inclusive or over-determined package of graph information to the receive module 104.

As described above, the receiver module 104 may represent one of a plurality of receiver modules (not shown). Each receiver module (and associated recipient) may have an individual entitlement to different portions of an entire set of graph information. Hence, the GID module 102 can send different packages of graph information to different respective receiver modules.

A provider synchronizer module 122 interacts with a complementary receiver synchronizer module 124 of the receiver module 104 to send graph information to the receiver module 104. Once again, the graph information may include a concise package of node structure information, key information, label information, and marker information. The provider synchronizer module 122 can supply the graph information on any basis. In one case, the provider synchronizer module 122 sends the graph information on a periodic basis, such as once a day, or once an hour, etc. Alternatively, or in addition, the provider synchronizer module 122 sends the graph information based on a triggering event. One such triggering event may correspond to an indication of the receipt of new access graph information from the graph providers (106, 108, . . . 110). Another triggering event may correspond to the express request for graph information from the receiver module 104, and so on. No limitation is placed on the protocol that the provider synchronizer module 122 may use to send graph information to the receiver module 104.

In one implementation, the provider synchronizer module 122 can send the graph information to the receiver module 104 after it determines that the receiver module 104 is entitled to receive the graph information. For example, for each node in the node structure, the provider synchronizer module 122 can determine whether the receiver module 104 is entitled to receive the private key for that node. If so, the provider synchronizer module 122 can authorize the dissemination of that key to the receiver module 104. To perform this task, the provider synchronizer module 122 can consult appropriate graph providers (106, 108, . . . 110). For example, assume that a node in question describes information gleaned from a human resource entity. In this case, the provider synchronizer module 122 can consult this particular graph provider to determine whether the recipient is entitled to receive the private key for this node. The provider synchronizer module 122 can use the connectivity information captured in the node structure to identify the sources of different parts of the node structure.

To perform the above function, the provider synchronizer module 122 can perform a mapping operation which relates the recipient with a node under consideration in the node structure. For example, assume that a node under consideration originates from a unit-related access graph. The provider synchronizer module 122 can determine whether a person p who is operating the receiver module 104 is associated with a unit represented by the node under consideration. The provider synchronizer module 122 can make this determination by consulting a graph provider which is the source of the node under consideration, or by consulting some other source of mapping information.

An item provider module 126 performs the task of sending one or more data items to the receiver module 104. In one case, the system 100 can integrate the GID module 102 and the item provider module 126, such that the item provider module 126 represents a functional module within the GID module 102. In another case, the system 100 can implement the GID module 102 and the item provider module 126 as two separate units (which can be administered by the same entity or different respective entities). Further, the GID module 102 and the item provider module 126 may be implemented at different respective locations or the same location. In any event, the item provider module 126 may interact with the GID module 102 to perform its functions. Although not shown, the system 100 may include plural item provider modules. For example, each item provider module 126 may supply data items from a respective authoring entity or publishing entity. One or more item provider modules can also be located within a same local environment as the receiver module 104.

The item provider module 126 performs various functions associated with the supply of the data item the receiver module 104. For instance, the item provider module 126 may encrypt an original data item 128 into an encrypted data item 130 using a content key ($K_d$). The item provider module 126 may also link the data item to the node structure. In doing so, the system 100 treats the data item as an access class node just like other nodes in the node structure which originate from the various access graphs.

The item provider module 126 can work in conjunction with the graph manager module 120 to define information which characterizes the node (e.g., the "data node") associated with the data item. For instance, the node can include the content key $K_d$ and a public label $L_d$. Further, the item provider module 126 can work in conjunction with the graph manager module 120 to add one or more markers to describe the link or links which connect the data item to the node structure. As discussed in connection with FIG. 2, the links and markers are collectively referred to as linking information herein. In one case, the data item constitutes a virtual node within the node structure. In this approach, the data item and its linking information are separately stored from the other nodes in the node structure (defined by the access graphs). The linking information virtually links the data item to the node structure.

Finally, the item provider module 126 supplies the encrypted data item 130 together with the linking information to the receiver module 104. The system 100 can use different protocols for sending data items and linking information to the receiver module 104. In one case, the provider synchronizer module 122 can be used to provide the data item and linking information to the receiver module 104. In another case, the item provider module 126 can use an independent information path (and possibly an independent communication protocol) to send the data item and linking information to the receiver module 104. The transfer of the data item and linking information to the receiver module 104 can use any approach, such as a push-based approach (in which the item provider module 126 initiates the transfer), a pull-based approach (in which the receiver module 104 initiates the transfer by requesting it), and so on.

The GID module 102 and the item provider module 126 can optionally encrypt the access-related information that they send to the receiver module 104. For example, the GID module 102 and the item provider module 126 can use key information associated with a particular recipient to encrypt the access-related information that it sends to that recipient, thereby reducing the risk that unauthorized entities can access the access-related information.

Now turning to the receiver module 104, the receiver module 104 includes a local access graph store 132. The local access graph store 132 stores the graph information that has been sent by the GID module 102, as received by the receiver synchronizer module 124. The local access graph store 132 can also optionally store encrypted data items and linking information that have been sent to it (either directly or indirectly) by the item provider module 126. As described above, the graph information and linking information constitute an economical package of access-related information that allows the receiver module 104 to access data items.

An item accessing module 134 constitutes the agent which actually performs the task of accessing a data item using the graph information and linking information. To perform this task, the item accessing module 134 relies on a path finder module 136. The path finder module 136 uses the graph information and linking information to establish a path through the node structure to retrieve the content key ($K_d$) of the data item. Once accessed, the item accessing module 134 can use the content key to decrypt the data item to provide a decrypted data item 138. Additional information regarding the way in which the item accessing module 134 and the path finder module 136 operate will be deferred until Section A.2 below. In addition to the constraints defined by the graph information and linking information (collectively referred to as access-related information), a license may govern the receiver module's 104 access to a data item. For example, a license may set a time period in which the user is permitted to use the access-related information to access the data item.

The receiver module 104 updates the graph information and linking information over time, e.g., on a periodic basis or any other basis. Accordingly, the local access graph store 132 may maintain several versions of the access-related information. The receiver module 104 can use different policies to manage and utilize the different versions of the access-related information. In one case, the receiver module 104 can retain old (non-current) versions of the access-related information, permitting the receiver module 104 to access corresponding old (previously received) data items which are linked to the old access-related information. However, in one case, the receiver module 104 may prohibit the use of the old access-related information to access newly received data items that are linked to a more recent version of the access-related information.

In one case, the GID module 102 and the item provider module 126 can send complete copies of the access-related information upon each update of the access-related information. In another case, the GID module 102 and the item provider module 126 can send delta increments upon each update. These delta increments can selectively provide the parts of the access-related information which have changed relative to an immediately previous version of the access-related information. Still other strategies can be used to provide and maintain access-related information.

In summary, the access-related information that is distributed to the receiver module 104 effectively represents policy considerations that govern access to data items. By distributing this access-related information in advance, the GID module 102 pre-enforces the policy considerations expressed by the access-related information. This aspect enables the receiver module 104 to access and consume the data items in an off-line mode of operation. In an off-line mode of operation, the receiver module 104 does not need to access centralized policy infrastructure to determine whether it is authorized to access the data item. Accordingly, this approach is particularly beneficial in those environments in which the receiver module 104 does not have access to centralized reporting infrastructure (although the approach can be used in any environment).

Alternatively, the GID module 102 (or some other access control service) can also provide on-line processing functionality 140. The on-line processing functionality 140 governs access to data items in an on-line mode of operation. For instance, upon request from the receiver module 104, the on-line processing functionality 140 determines whether the receiver module 104 is entitled to receive a data item by making reference to centrally-stored policy considerations (not shown). The on-line processing functionality 140 can provide a use license or the like if it determines that the receiver module 104 is authorized to receive the data item.

In one implementation, the system 100 can use either the on-line mode or the off-line mode for making access decisions. The system 100 can choose between these modes depending on various contextual factors. For example, if the on-line processing functionality 140 is available, the receiver module 104 can rely on this module to make decisions. If the on-line processing functionality 140 is not available, the receiver module 104 can operate in the off-line mode based on pre-distributed access-related information stored in its local access graph store 132. In another scenario, the receiver module 104 can attempt to access a data item in the off-line mode. If it cannot perform this function for any reason in the off-line mode, it may then attempt to access the data item using the on-line mode. Still other strategies for combining the on-line mode and off-line mode are possible.

In terms of physical implementation, the GID module 102 can be associated with a computer-implemented service that is accessible to one or more receiver modules 104. For example, the GID module 102 can be implemented by one or more server-type computers, one or more data stores, etc. The GID module 102 can be provided at a single site or can be distributed over plural sites. The item provider module 126 can likewise be associated with a computer-implemented service. That service can be either integrated with the GID module 102 or implemented separately (at least in part) from the GID module 102.

The receiver module 104 can be associated with any type of functionality for accessing a data item. In one case, the receiver module 104 may represent a computing device operated by a human recipient, such as a general purpose computer, a laptop computer, a personal digital assistant-type device, a mobile telephone device, a game console, and so on. The recipient can operate the computing device to access a data item in any application environment for any purpose.

In another case, the receiver module 104 may represent a computer-implemented local service for accessing data items. For example, the receiver module 104 can be implemented by one or more local server-type computers, data stores, etc. One or more end-user-type recipients may interact with such a local service to consume data items made accessible by the local service. Still other implementations of the GID module 102 and the receiver module 104 are possible.

A network (not shown) may couple the GID module 102 and the receiver module 104. The network may correspond to a wide area network (e.g., the Internet), a local area network, a point-to-point connection, etc., or any combination thereof. The network can be implemented by any combination of hardwired links, wireless links, routers, name servers, gateways, etc. The network can be governed by any protocol or combination of protocols.

A.2. Illustrative Linking Strategies

FIGS. 3-10 provide additional detail regarding possible relationships among nodes within the node structure. These figures therefore clarify how the receiver module 104 can use a limited set of access-related information to ultimately "reach" a node associated with a data item that it seeks to access. This allows the receiver module 104 to access a content key ($K_d$) associated with the data item and then use the content key to decrypt the data item. Metaphorically, the process of uncovering the content key may be likened to tracing a path through the node structure which leads to the content key, successively uncovering intermediary keys along the way.

Starting with FIG. 3, this figure shows a general strategy for using a key associated with a parent node to derive a key associated with a linked child node. This strategy is based on Mikhail J. Atallah, et al., "Dynamic and Efficient Key Management for Access Hierarchies," *Proceedings of the 12th ACM Conference on Computer and Communications*, 2005, pp. 190-202.

More specifically, FIG. 3 shows four nodes (302, 304, 306, and 308) in a directed graph. Nodes 304 and 306 are child nodes with respect to parent node 302. Node 308 is a child node with respect to parent nodes 304 and 306. Presume that, at the start of a derivation, a recipient is given a key ($K_1$) associated with the parent node 302. The recipient also is given public labels ($L_1$, $L_2$, $L_3$, $L_4$) associated with all of the nodes, as well as public markers ($y_{12}$, $y_{13}$, $y_{23}$, $y_{34}$) which connect the nodes together.

The recipient can derive all of the other keys ($K_2$, $K_3$, $K_4$) associated with nodes 304, 306, and 308, respectively, given the above "seed" information. To begin with, any marker between any two linked nodes i and j, where i is a parent of j, can take the form $y_{ij}=K_j$ XOR $H(K_i, L_j)$, wherein $y_{ij}$ is the marker value of the edge that links nodes i and j, $K_i$ is a key associated with node i, $K_j$ is a key associated with node j, $L_j$ is a public label associated with node j, "XOR" refers to a logical Exclusive OR operation, and $H(K_i, L_j)$ refers to a hash of $K_i$ and $L_j$ (providing by any type of hashing algorithm). Given this expression, the recipient can compute the key $K_2$ associated with node 304 and the key $K_3$ associated with node 306. Having obtained either $K_2$ or $K_3$, the recipient can generate the key $K_4$ associated with node 308. In this manner, the recipient can successively move down the hierarchy of nodes by uncovering keys, starting with the initial seed key of $K_1$ (along with the public information associated with the nodes and edges). Note that it is not necessary to supply the recipient with all of the keys in the node structure, just $K_1$.

Further note that, in one implementation, the recipient is not permitted to use a key associated with a descendent node to derive a key associated with a parent node. For example, suppose a recipient was supplied with key $K_2$, but not key $K_1$. In this case, because of the nature of the hashing function, the key $K_2$ cannot be used to derive the key $K_1$. Likewise, a recipient which is supplied the key $K_2$ cannot use the node structure to derive the key $K_3$, and vice versa.

FIGS. 1-2 and 4-15 present improvements on the key derivation approach shown in FIG. 3 that are not suggested by the approach shown in FIG. 3.

Figure 4:
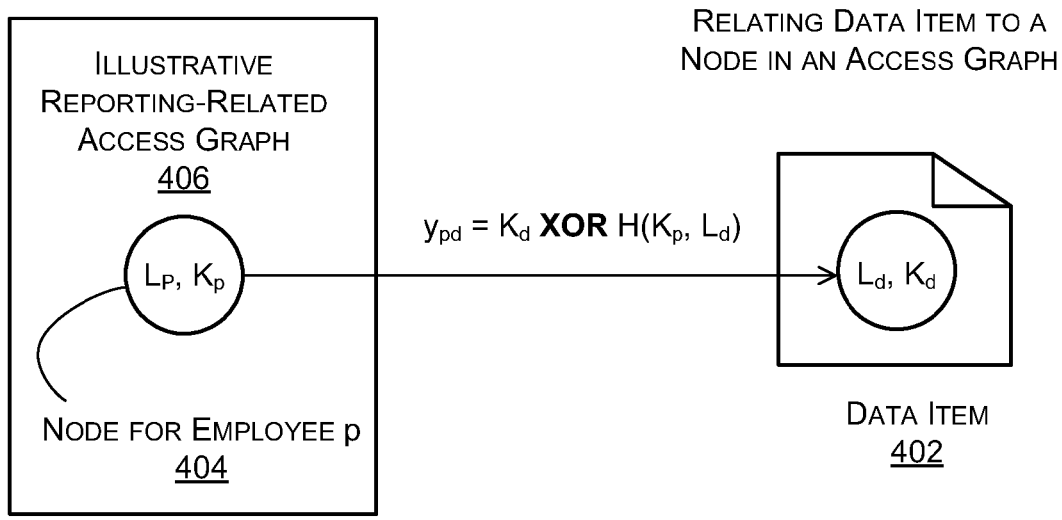
FIG. 4 is an example which demonstrates how a node in one access graph can be linked to a node in another access graph.

For example, FIG. 4 shows an approach for associating a data item 402 with a node 404 in an access graph 406. Assume, for example, that the node 404 identifies an employee p within a reporting-related access graph 406. In this case, a maker $y_{pd}$ can be used to express a link between the node 404 and the data item 402. The marker can take the form of $y_{pd}=K_d$ XOR $H(K_p, L_d)$, wherein $K_d$ is a key associated with the data item 402 (e.g., corresponding to the content key of the data item 402), $K_p$ is a key associated with the node 404, and $L_d$ refers to a public label associated with the data item 402. Thus, the recipient can compute key $K_d$ given $y_{pd}$, $K_p$, and $L_d$. As described above, the data item 402 can be considered a virtual node insofar as the data item 402 and the marker $y_{pd}$ need not be stored together with the other nodes of the node structure (associated with the access graphs).

Figure 5:
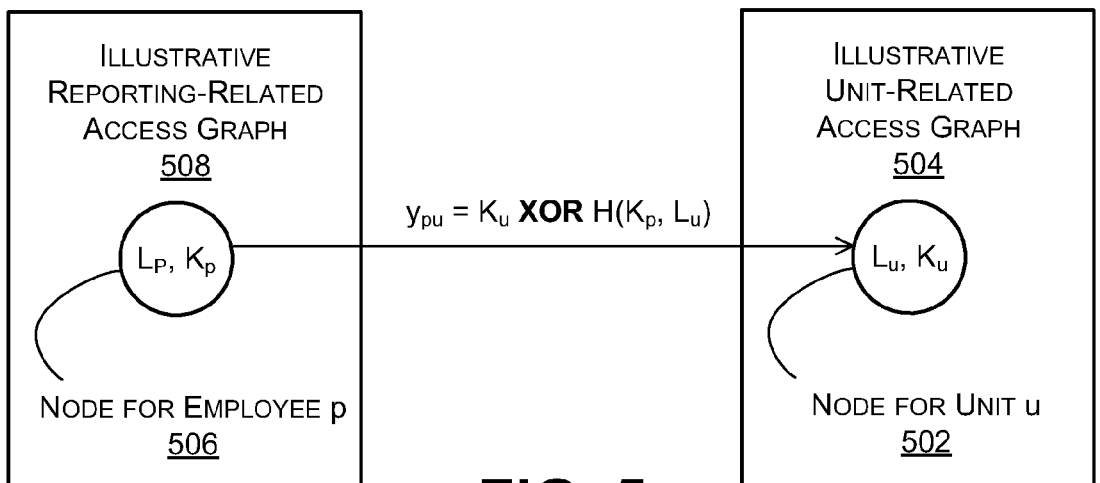
FIG. 5 is an example which demonstrates how a node in one access graph can be linked to a data item.

FIG. 5 shows an approach for associating a node 502 in a first access graph 504 with a node 506 in another access graph 508. Assume, for example, that the node 502 corresponds to a unit u within a unit-related access graph 504, while the node 506 identifies an employee p within a reporting-related access graph 508. In this case, a maker $y_{pu}$ can be used to express a link between the person p node 506 and the unit u node 502. The marker can take the form of $y_{pu}=K_u$ XOR $H(K_p, L_u)$, wherein $K_u$ is a key associated with the unit u node 502, $K_p$ is a key associated with the person p node 506, and $L_u$ refers to a public label associated with the unit u node 502. Thus, the recipient can compute $K_u$ given $y_{pu}$, $K_p$, and $L_u$.

Figure 6:
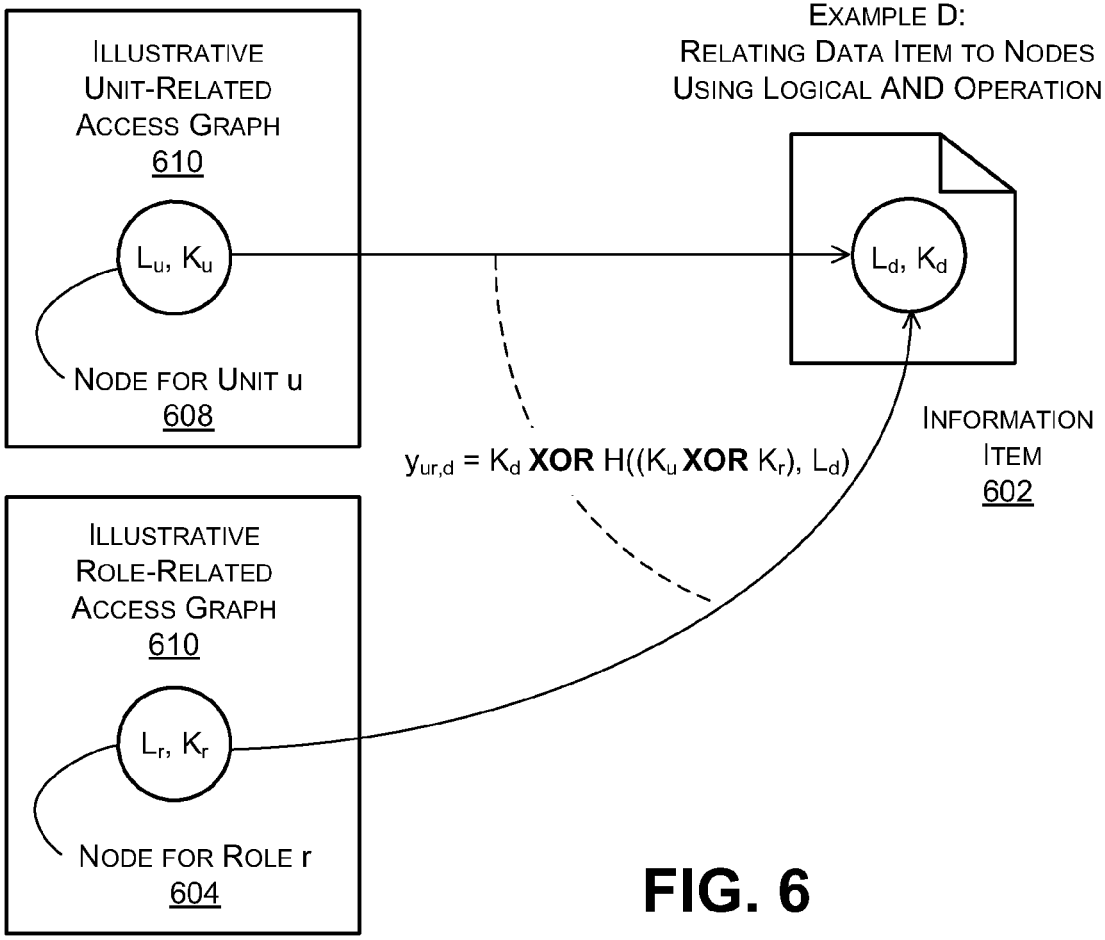
FIG. 6 is an example which demonstrates how two nodes in the node structure can be linked to a data item using a logical AND operation.

FIG. 6 shows an approach in which a data item 602 can be associated with two or more nodes in the node structure. For example, the data item 602 is associated with a node 604 in a first access graph 606 and a node 608 in another access graph 610. Assume, for example, that the node 604 corresponds to a role r within a role-related access graph 606, while the node 608 identifies a unit u within a unit-related access graph 610. In this case, a marker $y_{ur,d}$ can express the logical combination of policy factors associated with the role r node 604 and the unit u node 608. That is, the marker $y_{ur,d}$ can specify that the recipient is entitled to access the data item 602 if the recipient is associated with both role r and unit u, and therefore possesses corresponding keys for these nodes (604, 608). The marker can take the form of $y_{ur,d}=K_d$ XOR $H((K_u$ XOR $K_r), L_d)$, wherein $K_d$ is a key associated with the data item 602, $K_r$ is a key associated with the role r node 604, $K_u$ is a key associated with the unit u node 608, and $L_d$ refers to a public label associated with the data item 602. Here, a single marker represents two links, e.g., the link connecting the data item 602 with the role r node 604 and the link connecting the data item 602 to the unit u node 608. The recipient can compute $K_d$ given $y_{ur,d}$, $K_r$, $K_u$, and $L_u$. FIG. 6 shows the operation of logical AND over two policy factors, but the approach shown in FIG. 6 can be extended to perform the operation of logical AND over more than two policy factors.

Figure 7:
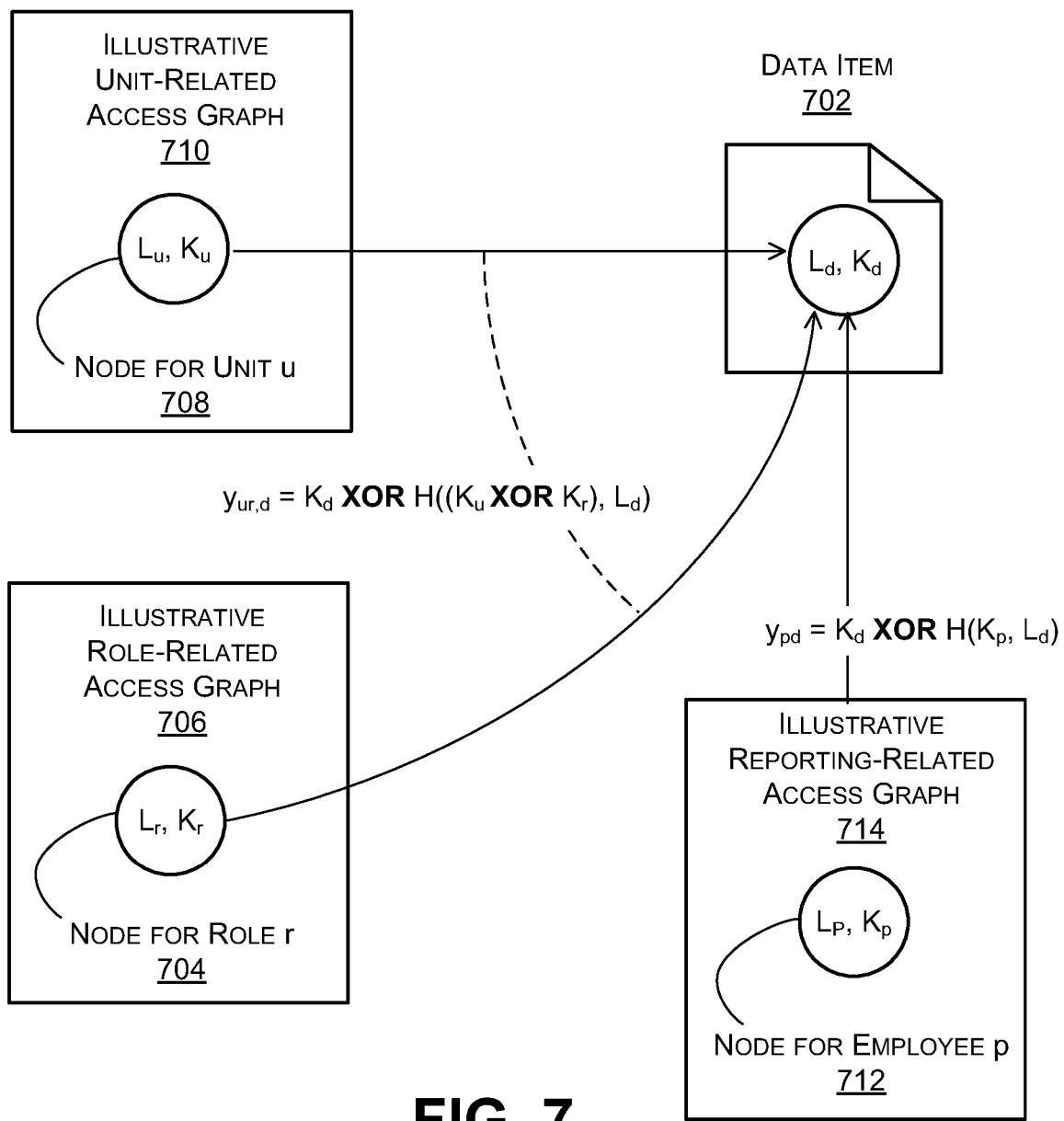
FIG. 7 is another example which demonstrates how nodes in the node structure can be linked to a data item using a logical AND operation.

FIG. 7 shows an approach in which a data item 702 can be associated with two or more nodes in the node structure using a logical AND combination in the manner described above for FIG. 6. That is, the data item 702 can be coupled to a node 704 in a first access graph 706 and a node 708 in another access graph 710. Assume, for example, that the node 704 corresponds to a role r within a role-related access graph 706, while the node 708 identifies a unit u within a unit-related access graph 710. Again, a marker $y_{ur,d}$ can express the logical combination of the nodes 704 and 708 as $y_{ur,d}=K_d$ XOR $H((K_u$ XOR $K_r), L_d)$, where the terms in this expression are described above. In addition, FIG. 7 shows that a node 712 (such as person node p) of an access graph 714 (such as a reporting-related access graph) can be connected to the data item 702 using the maker $y_{pd}=K_d$ XOR $H(K_p, L_d)$, wherein $K_d$ is a key associated with the data item 702, $K_p$ is a key associated with the person p node 712, and $L_d$ refers to a public label associated with the data item 702. In effect, the relationships shown FIG. 7 convey that a recipient can access the data item 702 if either: a) the recipient has role r and belongs to unit u; or b) the recipient corresponds to person p. Thus, the recipient can compute $K_d$ given either: a) $y_{ur,d}$, $K_r$, $K_u$, and $L_d$, or b) $y_{pd}$, $K_p$, and $L_d$.

Figure 8:
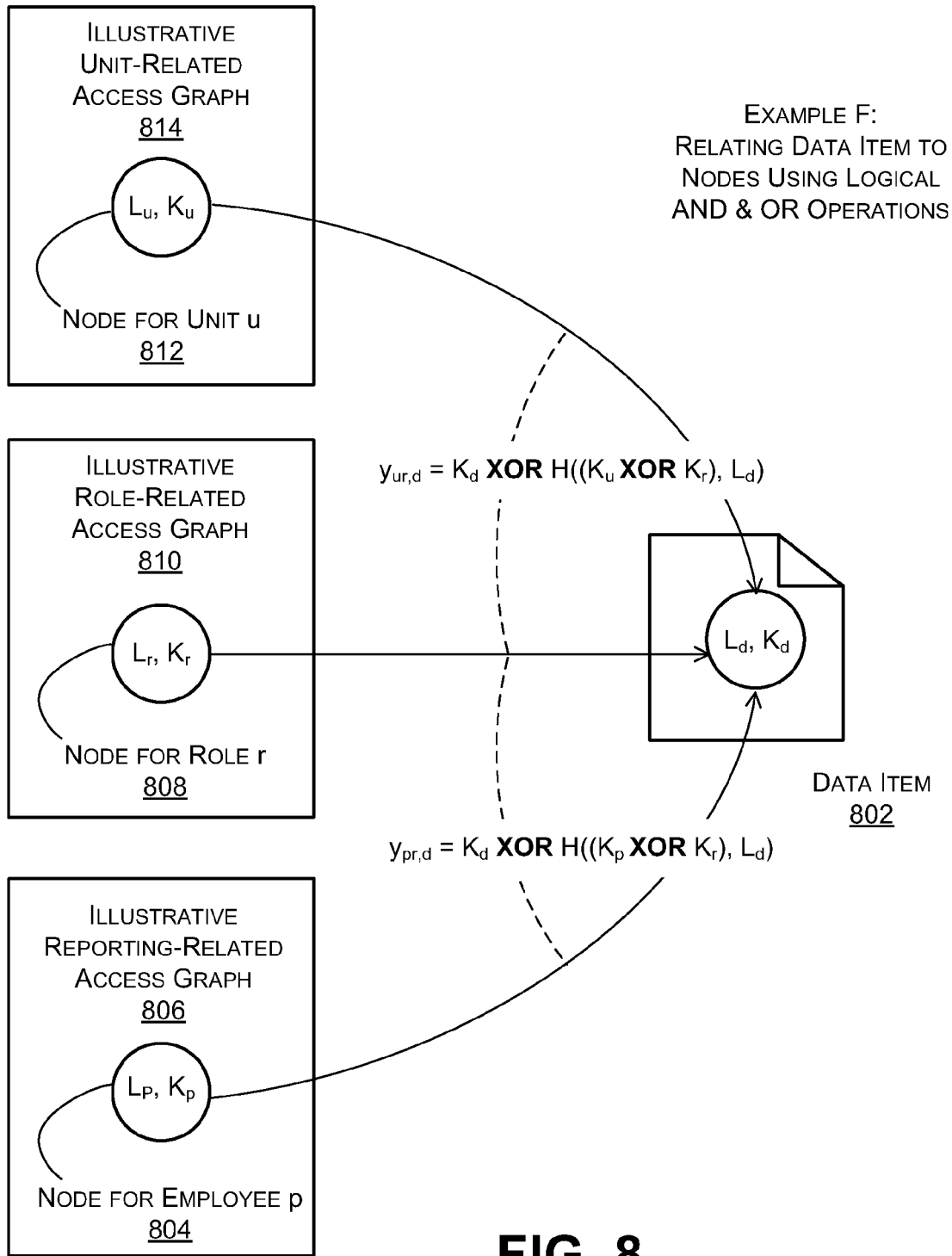
FIG. 8 is another example which demonstrates how nodes in the node structure can be linked to a data item using a logical AND operation.

FIG. 8 shows an example in which two logical AND operations can be used to associate three nodes in the node structure to a data item 802. That is, the data item 802 is connected to a node 804 (such as a person p node) in a first access graph 806 (such as a reporting-related access graph). The data item 802 is also connected to a node 808 (such a role r node) in another access graph 810 (such as a role-related access graph). The data item 802 is also connected to a node 812 (such a unit u node) in another access graph 814 (such as unit-related access graph). In this case, a marker $y_{pr,d}$ can express that the recipient is entitled to access the data item 802 if the recipient corresponds to person p who has role r. The marker $y_{ur,d}$ expresses that the recipient can alternatively access the data item 802 if the recipient has role r and is affiliated with unit u. The marker $y_{pr,d}$ can take the form of $y_{pr,d}=K_d$ XOR $H((K_p$ XOR $K_r)$, $L_d)$, while the marker $y_{ur,d}$ can take the form of $y_{ur,d}=K_d$ XOR $H((K_u$ XOR $K_r)$, $L_d)$, wherein terms in these expressions have been described above. The recipient can compute $K_d$ given either: a) $y_{pr,d}$, $K_r$, $K_p$, and $L_u$, or b) $y_{ur,d}$, $K_r$, $K_u$, and $L_u$.

Figure 9:
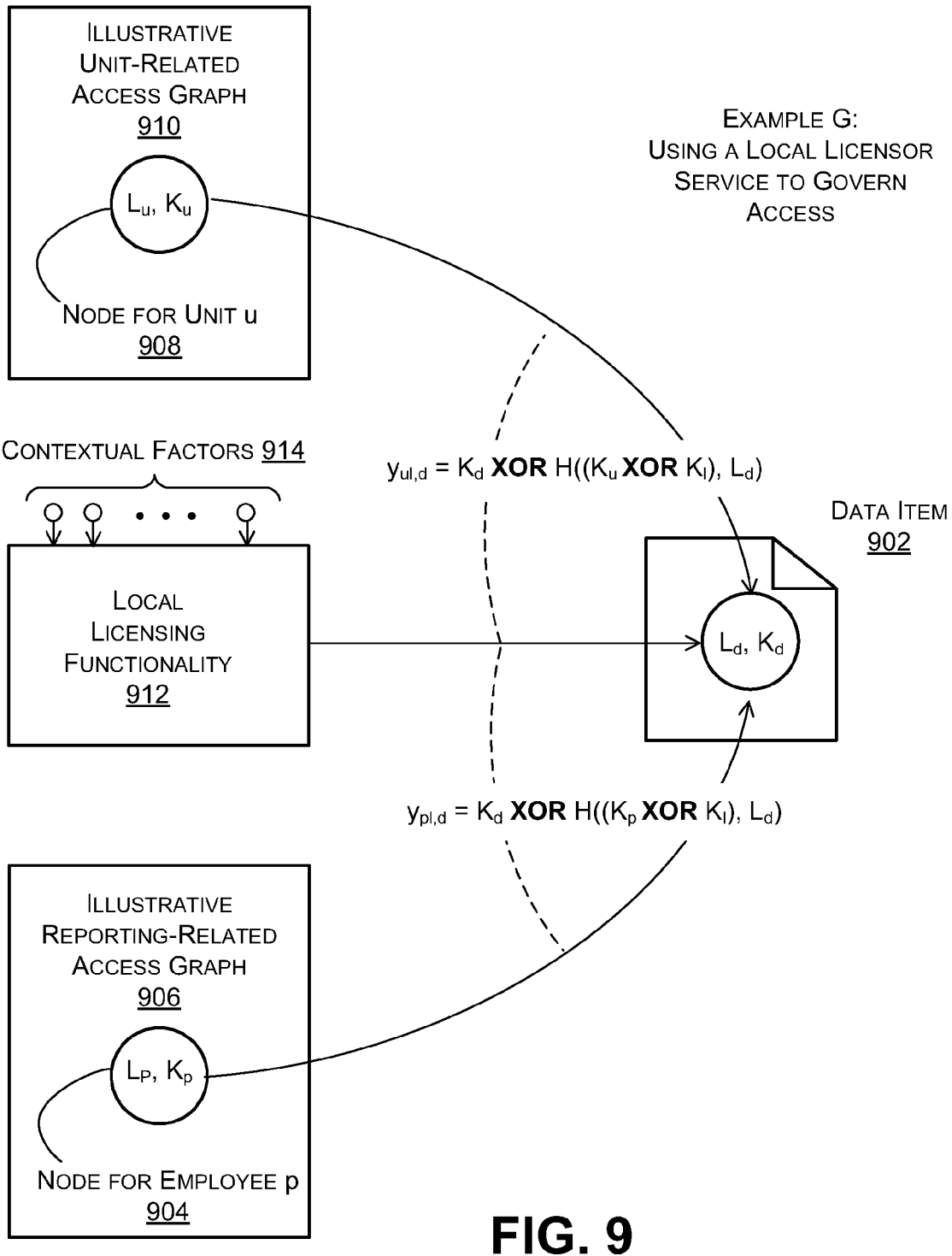
FIG. 9 is an example which demonstrates how local licensing functionality can be used in conjunction with downloaded access-related information to control access to data items.

FIG. 9 is similar to FIG. 8 in that a data item 902 is connected to a node 904 (such as a person p node) in a first access graph 906 (such as a reporting-related access graph) and another node 908 (such a unit u node) in another access graph 910 (such as a unit-related access graph). In addition, FIG. 9 shows that access to the data item 902 is made contingent on the approval of local licensing functionality 912. In one case, the local licensing functionality 912 may represent any type of functionality that is more local to the receiver module 104 relative to the on-line processing functionality 140 of FIG. 1. For example, the receiver module 104 can implement the local licensing functionality 912 as a component of the receiver module 104. Alternatively, the receiver module 104 can access a separate module which implements the local licensing functionality 912. For example, the local licensing functionality 912 can be implemented by one or more server-type computing devices that are considered local with respect to the receiver module 104. (For that matter, the item provider module 126 that supplies the data item 902 can be either remote or local with respect to the receiver module 104.)

The local licensing functionality 912 can apply any type of policy consideration (or considerations) to determine whether the receiver module 104 is entitled to access the data item 902. If these policy considerations are met, the local licensing functionality 912 can provide a licensing key $K_1$ to the receiver module 104. The licensing key $K_1$ represents a key that is provided in addition to the set of licensing keys (e.g., $K_r$ and $K_u$) provided to the receiver module 104 from the GID module 102.

In one implementation, the local licensing functionality 912 can optionally base its decision on one or more policy considerations that are contextual in nature, as represented by one or more contextual factors 914. To cite merely one representative example, the local licensing functionality 912 can include location-determination functionality (e.g., GPS functionality) that identifies a present location of a mobile receiver module 104. The local licensing functionality 912 can generate the key $K_1$ as a function of the output of the location-determination functionality. For example, the local licensing functionality 912 can generate the key $K_1$ if the receiver module 104 is within a certain geographical region in which the receiver module 104 is authorized to receive the data item 902. This example is merely illustrative of a wide variety of policy considerations that can be used to apply local licensing considerations to the determination of whether the receiver module 104 is entitled to access the data item 902 at any given in time.

FIG. 9 shows that the key $K_1$ can be combined with other nodes in the node structure in any way to express complex conditions governing access to the data item 902. For example, the makers ($y_{pl,d}$ and $y_{ul,d}$) in FIG. 9 indicates that the receiver module 104 can access the data item 902 if either: a) the recipient is associated with employee p and is granted key $K_1$; or b) the recipient is affiliated with unit u and is granted to key $K_1$. Applied to the GPS scenario, these expressions may convey that the recipient is entitled to receive the data item 902 if he or she is within a given geographical region and is either person p or affiliated with unit u. This is merely one example. Other links can be formulated to express other logical relations which link the local licensing functionality 912 to the node structure of the access graphs.

In one case, the local licensing functionality 912 can internally perform the hashing operations that are used to compute the content key $K_d$ of the data item 902. In this approach, the content key $K_1$ generated by the local licensing functionality 912 need not be released outside an access control perimeter defined by the local licensing functionality 912. This helps prevent an unauthorized entity from accessing the content key $K_1$, and, ultimately, the data item 902.

The use of the local licensing functionality represents a hybrid solution to the task of enforcing a rights management policy. That is, in one approach, the receiver module 104 determines whether it is permitted to access the data item 902 by making reference to the on-line processing functionality 140. The on-line processing functionality 140 makes an authorization decision by making reference to centralized policy considerations. In another approach, the receiver module 104 determines whether the recipient is entitled to access a data item by making reference to pre-distributed access-related information which is stored in the local access graph store 132. In effect, the access-related information expresses a pre-enforced set of policy considerations that govern access to the data item. In FIG. 9, the receiver module 104 is relying on both the dynamic ("on-the-fly" and possibly context-dependent) analysis of the local licensing functionality 912 and the pre-enforced policy consideration reflected in the access-related information. Hence, the implementation of FIG. 9 is a hybrid between a first solution which places complete reliance on a dynamic licensing service and a second solution which places complete reliance on pre-distributed access-related information.

Figure 10:
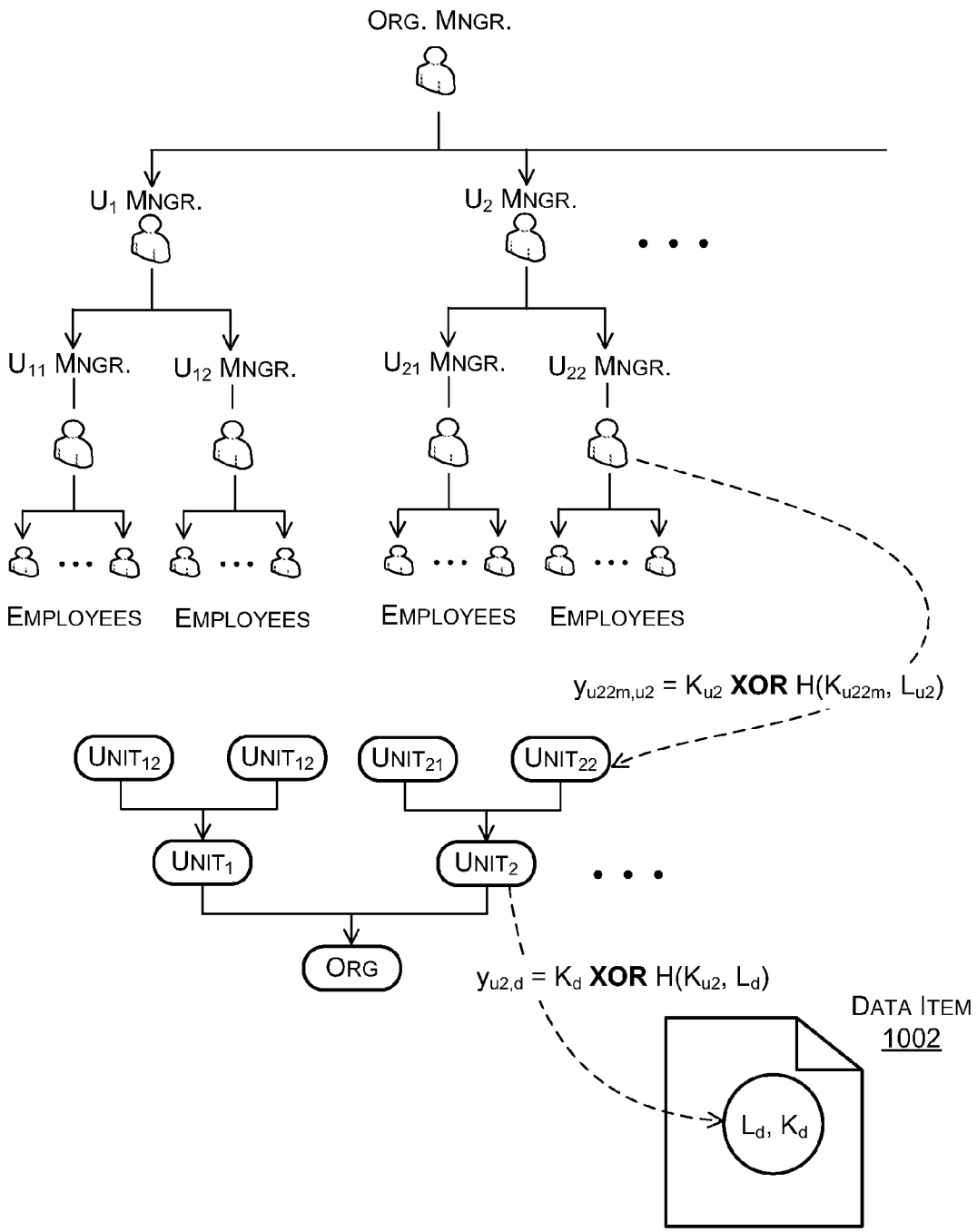
FIG. 10 is an example which demonstrates how an access graph associated with a reporting hierarchy can be linked to an access graph associated with a unit hierarchy, and how data items can be linked to the resultant node structure.

FIG. 10 presents an example which combines some of the principles set forth with reference to previous figures. This example shows two access graphs. A first (top-most) access graph corresponds to a reporting-related access graph. This access graph identifies members within an organization and the reporting links between its members. For example, the reporting-related access graph indicates that employees of $unit_{21}$ report to a manager of $unit_{21}$, the manager of $unit_{21}$ reports to a manager of $unit_2$, and the manager of $unit_2$ reports to an overarching organization manager.

The second (bottom-most) access graph corresponds to a unit-related access graph. This access graph identifies units within the organization and relations among the units. For example, the unit-related access graph indicates that $unit_{22}$ is a part of unit$_2$, and unit$_2$ is a part of the overall organization. In both graphs, a data item that is associated with any child node is presumed to be made available to its linked ancestor nodes. In view of this feature, the unit-related access graph is inverted (turned "upside down") to ensure that child units are given access to data items that are made available to their respective parent units.

Presume that there are a number of inter-graph links that connect the nodes of the reporting-related access graph to the nodes of the unit-related access graph. For example, a link may point from the unit$_{22}$ manager node of the reporting-related access graph to the unit$_{22}$ node of the unit-related access graph. The graph manager module 120 can assign the marker $y_{u22m,u22}=K_{u22}$ XOR $H(K_{u22m}, L_{u22})$ to this link, where $K_{u22}$ refers to a key associated with the unit$_{22}$ node, $K_{u22m}$ refers to a key associated with the unit$_{22}$ manager node, and $L_{u22}$ refers to a public label associated with the unit$_{22}$ node. Further assume that a data item 1002 is associated with the unit$_2$ node using the marker $y_{u2,d}=K_d$ XOR $H(K_{u2}, L_d)$, where $K_d$ refers to a key associated with data item 1002 (which corresponds to the content key used to decrypt the data item 1002), $K_{u2}$ refers to a key associated with the unit$_2$ node, and $L_d$ refers to a public label associated with the data item 1002. The graph information and linking information associated with these access graphs can be used to receive the content key $K_d$ associated with the data item 1002. This task can be performed by essentially following the links through the access graphs, starting with a node for which the recipient possesses a private key.

In general, the type of linking information shown in FIG. 10 can be used to express alternative relations among nodes in the node structure. For example, a manager may have an idiosyncratic relation to another part of an organization that is not reflected in the standard access graph information received from the graph providers (106, 108, . . . 110). A link and corresponding marker can be used to express this relation. Such a link can express an alternative relation within a particular access graph or between two different access graphs.

The path finder module 136 (of FIG. 1) performs the role of finding a path through the node structure defined by one or more access graphs to locate a desired data item that the recipient is authorized to access. Any type of graph search algorithm can be used to discover this path. In one case, the path finder module 136 can find the available paths by first identifying the nodes for which the recipient possesses keys. These nodes represent starting points. The path finder module 136 can then follow the paths which emanate from these starting nodes, identifying those paths which ultimately link to the data item. The path finder module 136 can also apply various algorithms to make the search though the node structure more efficient, such as the breadth-first algorithm, etc.

The graph manager module 120 of the GID module 102 can generate the graph information to reduce the occurrence of graph cycling. In graph cycling, the path finder module 136 may become "stuck" in a loop within the node structure that does not terminate in a data item. To reduce this phenomenon, the graph manager module 120 can provide additional nodes in the node structure which reduce the risk of graph cycling.

B. Illustrative Processes

FIGS. 11-14 show procedures that illustrate the operation of the system 100 of FIG. 1. Since the principles underlying the operation of the system 100 have already been described in Section A, certain operations will be addressed in summary fashion in this section.

Figure 11:
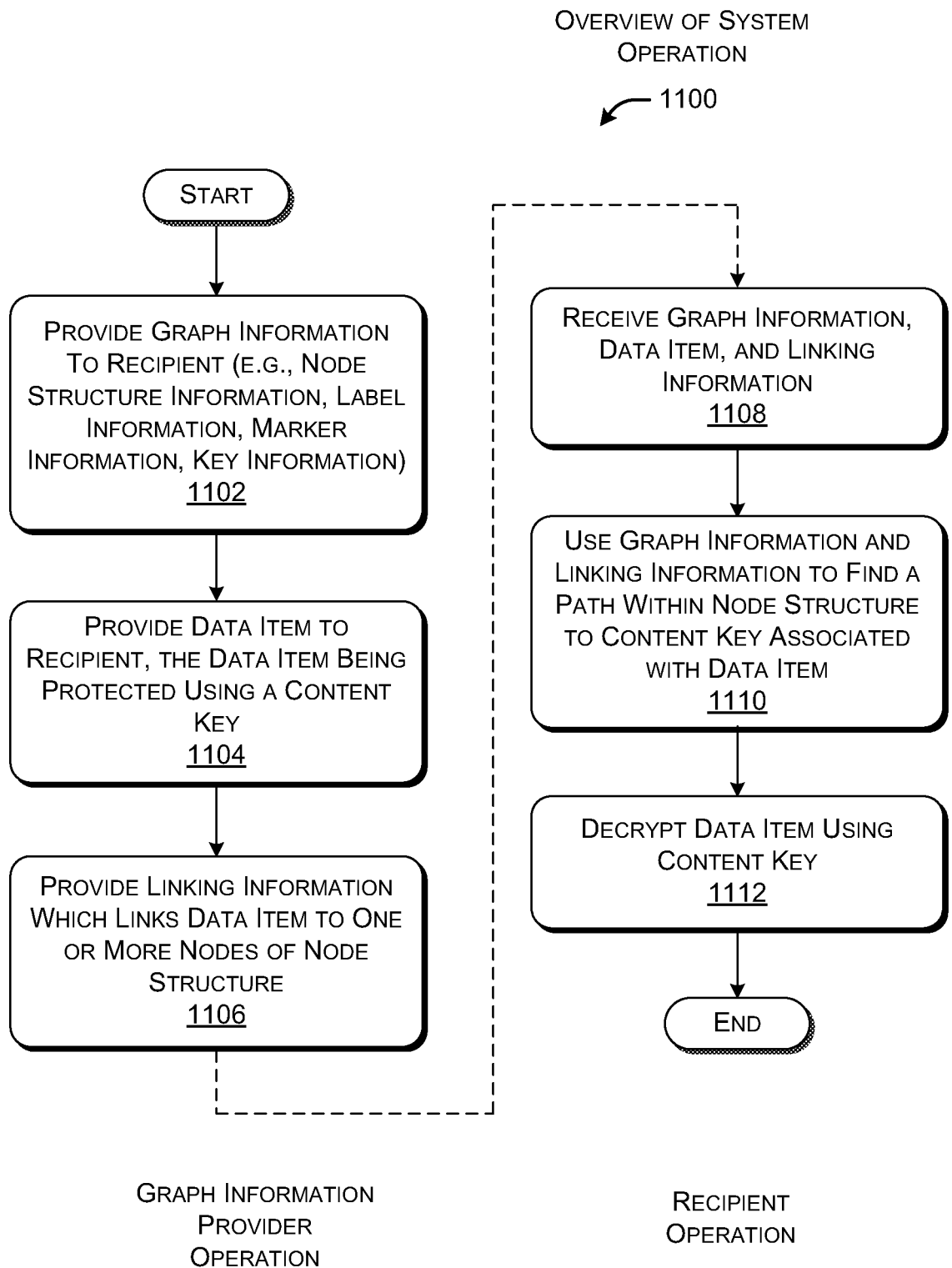
FIG. 11 is a procedure which provides an overview of the operation of the system of FIG. 1, according to one illustrative implementation.

FIG. 11 is a procedure which provides an overview of the operation of the system 100 of FIG. 1, according to one illustrative implementation.

In block 1102, the GID module 102 provides graph information to a recipient. The graph information may include node structure information (which describes part of the node structure provided by one or more access graphs), label information (which provides a set of public labels associated with nodes in the node structure), marker information (which provides a set of makers associated with edges in the node structure), and key information (which provides a set of secret keys that the recipient is entitled to receive, the keys being associated with respective nodes in the node structure).

In block 1104, the item provider module 126 provides a data item to the recipient. The data item is encrypted with a content key ($K_d$).

In block 1106, the item provider module 126 can provide linking information to the recipient. The linking information describes how the data item is related to the node structure. The linking information and the data item can be stored apart from the node structure, thus establishing the data item as a virtual node of the node structure. The linking information itself can include one or more markers that describe how the data item is linked to the node structure.

In block 1108, the receiver module 104 receives the graph information, encrypted data item, and linking information.

In block 1110, the receiver module 104 uses the received information to find a path within the node structure that leads to the content key ($K_d$) associated with the data item.

In block 1112, the receiver module 104 uses the derived content key ($K_d$) to decrypt the data item.

Figure 12:
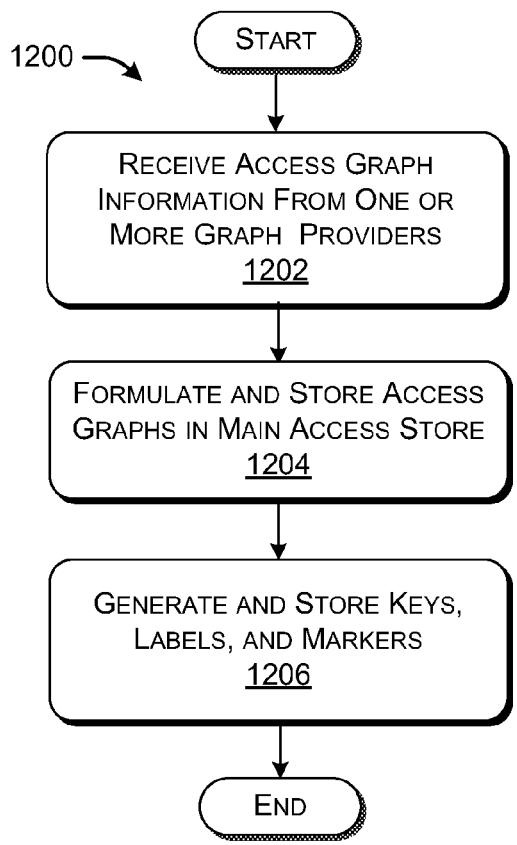
FIG. 12 is a procedure which explains how a graph information distribution (GID) module of FIG. 1 can be used to generate graph information.

FIG. 12 is a procedure which explains how the GID module 102 of FIG. 1 can be used to generate graph information.

In block 1202, the GID module 102 receives access graph information from one or more graph providers (106, 108, . . . 110). For example, one such graph provider may correspond to a human resource entity which provides information that can be used to populate a reporting-related access graph.

In block 1204, the GID module 102 formulates the access graph information that it has received into plural access graphs, and then stores the access graphs in the main access graph store 118. Collectively, the nodes in the access graphs define a node structure.

In block 1206, the graph manager module 120 of the GID module 102 generates keys, labels, and markers associated with the node structure. Block 1206 results in the generation of graph information. As explained above, the graph information may include node structure information, key information, label information, and marker information.

Figure 13:
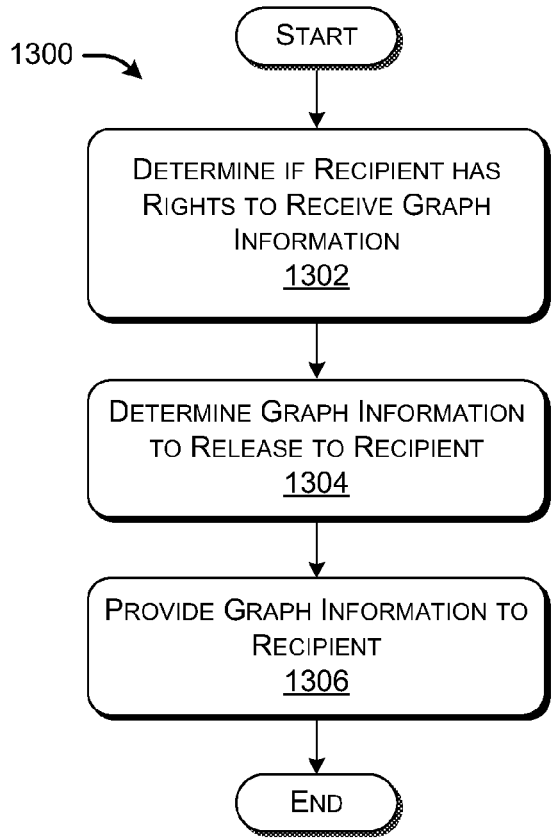
FIG. 13 is a procedure which explains how the GID module of FIG. 1 can be used to provide graph information to a recipient.

FIG. 13 is a procedure which explains how the GID module 102 of FIG. 1 can be used to provide graph information to a recipient.

In block 1302, the GID module 102 determines if a recipient has rights to receive graph information. For example, assume that the release of graph information implicates one or more nodes within the node structure. The GID module 102 can determine whether the recipient is authorized to access information associated with these nodes, and hence whether the recipient is authorized to receive keys associated with these nodes. The GID module 102 can make this determination by consulting one or more graph providers (106, 108, . . . 110) associated with the implicated nodes in the node structure. The node structure preserves links which indicate the sources of the nodes in the node structure.

In block 1304, the GID module 1304 determines the set of graph information which is appropriate to send to the recipient. As discussed above, it may be appropriate to include that package of graph information which enables the recipient to access data items, but is not otherwise over-inclusive.

In block 1306, the provider synchronizer module 122 of the GID module 102 provides the graph information to the recipient.

Figure 14:
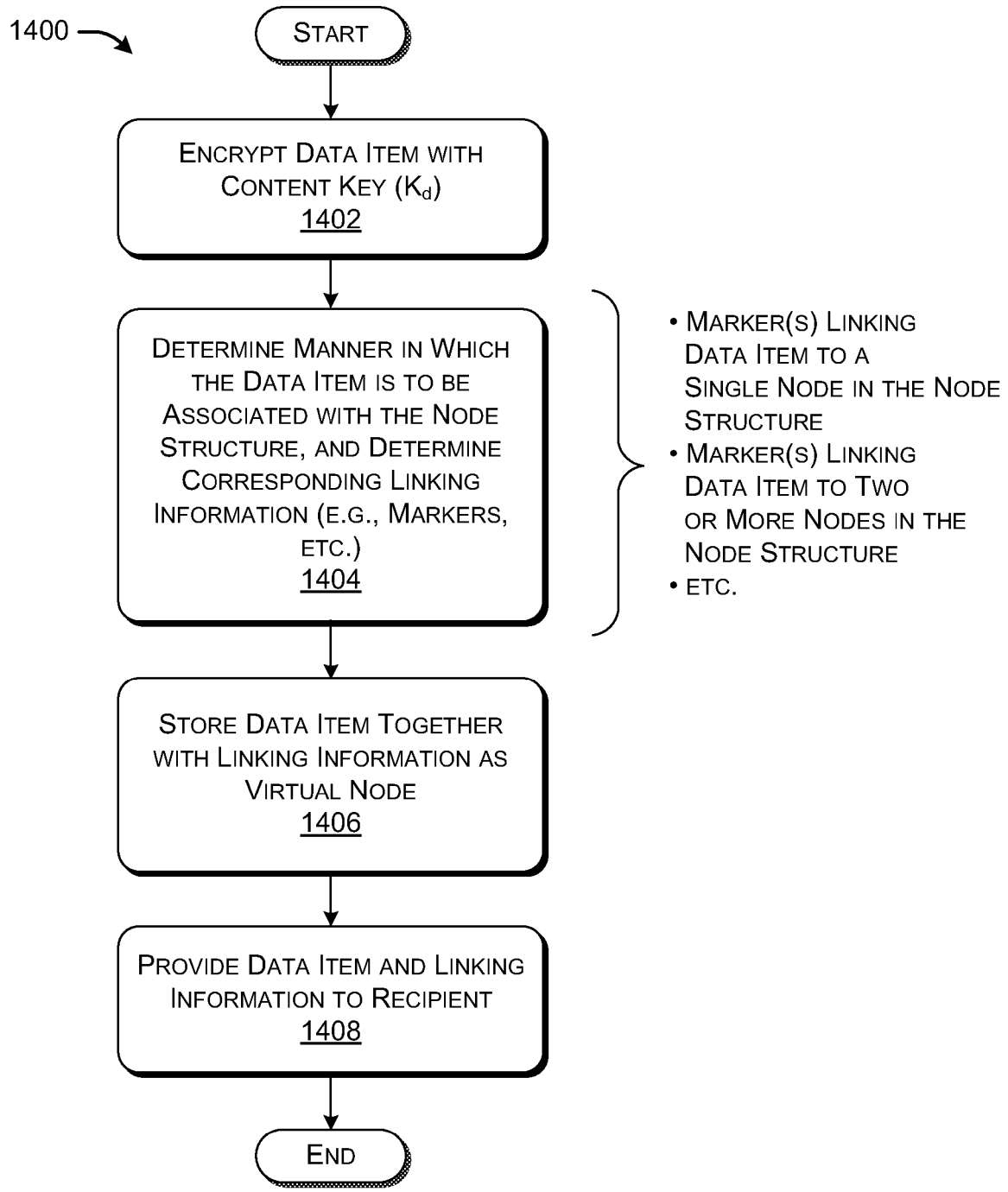
FIG. 14 is a procedure which explains how the system of FIG. 1 can be used to provide a data item to a recipient, together with linking information.

FIG. 14 is a procedure which explains how the GID module 102 of FIG. 1 can be used to provide a data item, together with linking information, to a recipient.

In block 1402, the item provider module 126 can encrypt the data item with a content key ($K_d$).

In block 1404, the item provider module 126 can determine what policy considerations will be used to govern access to the data item. This, in turn, determines the manner in which the data item is linked to the node structure, as defined by one or more markers. A first type of marker can link the data item to the node structure using a single link. A second type of marker can link the data item to the node structure using two or more links. The latter type of marker can be used to express a logical AND operation among two or more policy factors. The labels and markers associated with the data item constitute linking information.

In block 1406, the system 100 can store the encrypted data item together with the linking information. As described above, the system 100 can store the data item and linking information separately from the node structure; this aspect renders the data item a virtual link of the node structure.

In block 1408, the system 100 can provide the data item and linking information to the recipient.

C. Representative Processing Functionality

FIG. 15 sets forth illustrative electrical data processing functionality 1500 that can be used to implement any aspect of the functions described above. With reference to FIG. 1, for instance, the type of processing functionality 1500 shown in FIG. 15 can be used to implement any aspect of the system 100, such as the GID module 102, the receiver module 104, etc. In one case, the processing functionality 1500 may correspond to any type of computing device that includes one or more processing devices.

The processing functionality 1500 can include volatile and non-volatile memory, such as RAM 1502 and ROM 1504, as well as one or more processing devices 1506. The processing functionality 1500 also optionally includes various media devices 1508, such as a hard disk module, an optical disk module, and so forth. The processing functionality 1500 can perform various operations identified above when the processing device(s) 1506 executes instructions that are maintained by memory (e.g., RAM 1502, ROM 1504, or elsewhere). More generally, instructions and other information can be stored on any computer readable medium 1510, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1500 also includes an input/output module 1512 for receiving various inputs from a user (via input modules 1514), and for providing various outputs to the user (via output modules). One particular output mechanism may include a presentation module 1516 and an associated graphical user interface (GUI) 1518. The processing functionality 1500 can also include one or more network interfaces 1520 for exchanging data with other devices via one or more communication conduits 1522. One or more communication buses 1524 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing off-line access to a data item, the method comprising:
   providing graph information to a recipient, the graph information including:
      node structure information which describes at least part of a node structure provided by one or more access graphs;
      label information which provides labels associated with a set of nodes in the node structure;
      marker information which provides markers associated with a set of edges connecting individual nodes from the set of nodes in the node structure; and
      key information which provides a set of keys that entitle the recipient to access at least part of the node structure;
   providing the data item to the recipient, the data item being protected using a content key;
   generating another marker and including the another marker in linking information, wherein the linking information associates the data item with the node structure as another node of the node structure representing the data item, the linking information associating the data item with at least a first node of the set of nodes in the node structure and a second node of the set of nodes in the node structure, and
   providing the linking information to the recipient,
   wherein generating the another marker comprises:
      applying one or more mathematical or logical operations to:
         the content key that protects the data item;
         a first key from the set of keys that is associated with the first node;
         a second key from the set of keys that is associated with the second node; and
         an individual label that is associated with the data item, the individual label associated with the data item being different than the content key that protects the data item, and
      applying a hash function to the first key, the second key, and the label,
   wherein the graph information and the linking information allow the recipient to access the content key and decrypt the data item using the content key, and
   at least the generating the another marker is performed by a computing device.

2. The method of claim 1, wherein two or more of the access graphs correspond to aspects of an organizational structure.

3. The method of claim 1, wherein said one or more access graphs comprise:
   a first access graph that represents a reporting relationship among entities;
   a second access graph that represents roles associated with the entities; and
   a third access graph that represents units with which the entities are affiliated.

4. The method of claim 1, wherein an identified key in the set of keys confers an access right that corresponds to an identified node within the node structure, the access right extending to one or more other nodes that are descendents of the identified node.

5. The method of claim 1, wherein an individual marker relates an individual node in a first access graph to another individual node in a second access graph.

6. The method of claim 1, wherein an individual marker relates an individual node in a first access graph to another individual node in the first access graph.

7. The method of claim 1, wherein the another marker uses a logical AND operation to relate the data item to the first node and the second node.

8. The method of claim 1, wherein the another marker is expressed by: $y_{12,d}=K_d$ XOR $H((K_1$ XOR $K_2), L_d)$, where $y_{12,d}$ represents the another marker, $K_d$ represents the content key that protects the data item, $K_1$ represents the first key, $K_2$ represents the second key, $L_d$ represents the label associated with the data item, and H represents the hash function.

9. The method of claim 1, further comprising, before providing the graph information to the recipient, determining whether the recipient is entitled to receive the graph information.

10. The method according to claim 1, wherein at least one of the nodes from the set of nodes represents a member of an organization that is entitled to use the data item.

11. The method of claim 1, wherein the hash function is applied to an exclusive OR operation of the first key and the second key.

12. The method of claim 11, wherein the mathematical or logical operations comprise another exclusive OR operation.

13. One or more computer readable memory devices or storage devices storing computer readable instructions, the computer readable instructions providing an electronic graph manager module when executed by one or more processing devices, the computer readable instructions comprising:
   logic configured to generate a marker which relates a data item to at least a first node and a second node in a node structure, the node structure being provided by one or more access graphs, wherein the marker reflects one or more logical operations on:
   a key associated with the data item,
   a label associated with the data item, the label associated with the data item being different than the key associated with the data item,
   a first key, wherein the first key is associated with the first node in the node structure, and
   a second key, wherein the second key is associated with the second node in the node structure;
      wherein the marker, together with provided graph information, allows a recipient to access the data item by computing the key associated with the data item using the marker, and
   the marker reflects a hash function applied to the label and at least one of the first key or the second key.

14. The one or more computer readable memory devices or storage devices of claim 13, wherein the marker uses a logical AND operation to relate the data item to the first node and the second node.

15. The one or more computer readable memory devices or storage devices of claim 13, wherein the marker is expressed by: $y_{12,d}=K_d$ XOR $H((K_1$ XOR $K_2), L_d)$, where $y_{12,d}$ represents the marker, $K_d$ represents the key associated with the data item, $K_1$ represents the first key, $K_2$ represents the second key, $L_d$ represents the label, and H represents the hash function.

16. The one or more computer readable memory devices or storage devices of claim 13, wherein the first node and the second node are associated with different access graphs.

17. A system for accessing a data item, the system comprising:
   a receiver module configured to:
      receive graph information, the graph information pertaining to a node structure associated with one or more access graphs, the data item being represented by a data node that is related to a first node in the node structure representing a member of an organization and a second node in the node structure,
      use the graph information to trace a path through the node structure to access the data item, and
      compute a key to decrypt the data item using a marker, wherein the marker reflects:
         one or more logical operations on at least:
            the key used to decrypt the data item,
            a first key associated with the first node representing the member of the organization,
            a second key associated with the second node, and
            a label associated with the data item, the label associated with the data item being different than the key used to decrypt the data item; and
         a hash function applied to the label and at least one of the first key or the second key, and
   at least one processing device configured to execute the receiver module.

18. The system of claim 17, wherein the first node and second node are in different access graphs of the node structure.

19. The system of claim 17, wherein the receiver module is further configured to rely on local licensing functionality to access the data item.

20. The system according to claim 17, wherein the path through the node structure goes through the first node to the data node.

* * * * *